(12) United States Patent
Pennanen

(10) Patent No.: US 7,457,317 B1
(45) Date of Patent: Nov. 25, 2008

(54) METHOD AND SYSTEM FOR USING VARIABLE-SIZE FRAME-BASED EVENTS FOR COMMUNICATING OVER AN INTERFACE

(75) Inventor: Juha Pennanen, Oulu (FI)

(73) Assignee: National Semiconductor Corporation, Santa Clara, CA (US)

( * ) Notice: Subject to any disclaimer, the term of this patent is extended or adjusted under 35 U.S.C. 154(b) by 783 days.

(21) Appl. No.: 10/846,395

(22) Filed: May 14, 2004

(51) Int. Cl.
*H04J 3/24* (2006.01)

(52) U.S. Cl. .................. 370/474; 370/476; 370/477

(58) Field of Classification Search .............. 370/474, 370/476, 477
See application file for complete search history.

(56) References Cited

U.S. PATENT DOCUMENTS 6,834,307 B2 * 12/2004 Magnussen et al. ......... 709/230
7,194,535 B2 * 3/2007 Hannel et al. ............... 709/224

* cited by examiner

*Primary Examiner*—Ricky Ngo
*Assistant Examiner*—Chandrahas Patel

(57) ABSTRACT

A method for minimizing bandwidth consumption for communicating over an interface is provided that includes defining a one-frame event that comprises a specified operation type and defining an n-frame event that comprises the specified operation type. A single frame is assembled for the one-frame event. The single frame comprises an event type identifier that is operable to identify the single frame as corresponding to the one-frame event. The single frame is sent over the interface.

16 Claims, 2 Drawing Sheets

METHOD AND SYSTEM FOR USING VARIABLE-SIZE FRAME-BASED EVENTS FOR COMMUNICATING OVER AN INTERFACE

TECHNICAL FIELD OF THE INVENTION

The present invention is directed in general to bus protocols and, more specifically, to a method and system for using variable-size frame-based events for communicating over an interface.

BACKGROUND OF THE INVENTION

Conventional general purpose bus protocols use a fixed format in communicating over an interface. The format is based on the use of fixed or variable length data frames to pass data over the interface. The amount of bits and symbols that can be conveniently stored, coded and decoded by the sending and receiving components, and other similar implementation-related constraints, may limit the length of a frame and typically fix the length of the frame to a static value.

Transactions across the interface usually consist of multiple frames in a standard format. The format typically includes trip and register address data and payload data in a three-frame format. Thus, these conventional general purpose bus protocols use the same bandwidth for each transaction over the interface, which affects power consumption, clock rates, electromagnetic interference and electromagnetic emissions. While some general purpose bus protocols use a different number of frames for different operations, each particular operation has its own sequence of frames that does not vary. In addition, general purpose bus protocols typically provide a mechanism for deciding which component has access to and/or priority on the bus in the form of collision detection and arbitration, which may result in the consumption of more bandwidth.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
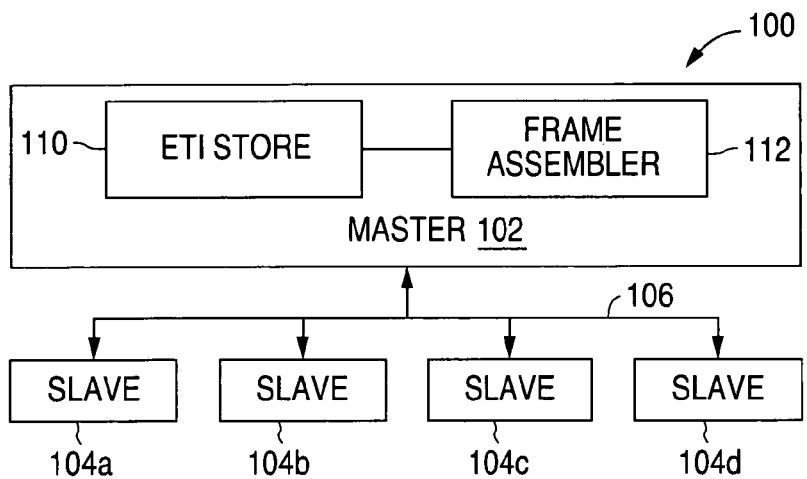
FIG. 1 is a block diagram illustrating a system operable to implement a bus protocol capable of using variable-size frame-based events for communicating over an interface in accordance with one embodiment of the present invention.
Figure 2A:
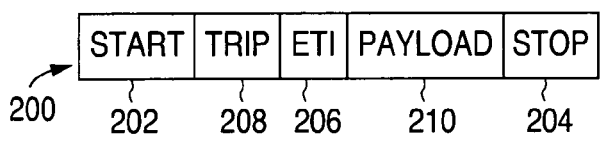
FIGS. 2A-C are block diagrams illustrating frame structures for one-frame, two-frame and three-frame events for use in the system of FIG. 1 in accordance with one embodiment of the present invention.
Figure 2B:
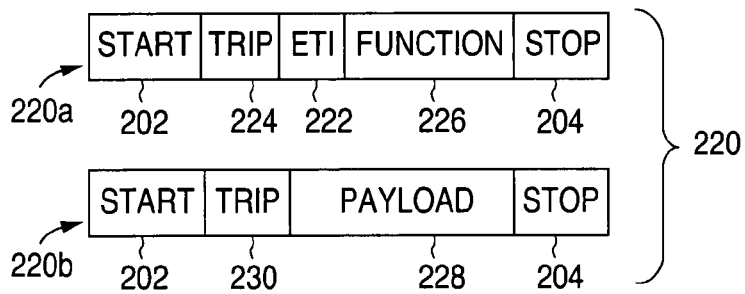
Figure 2C:
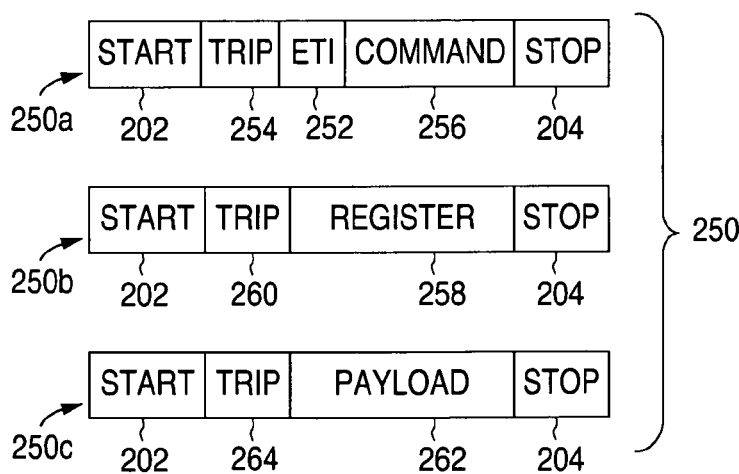
Figure 3:
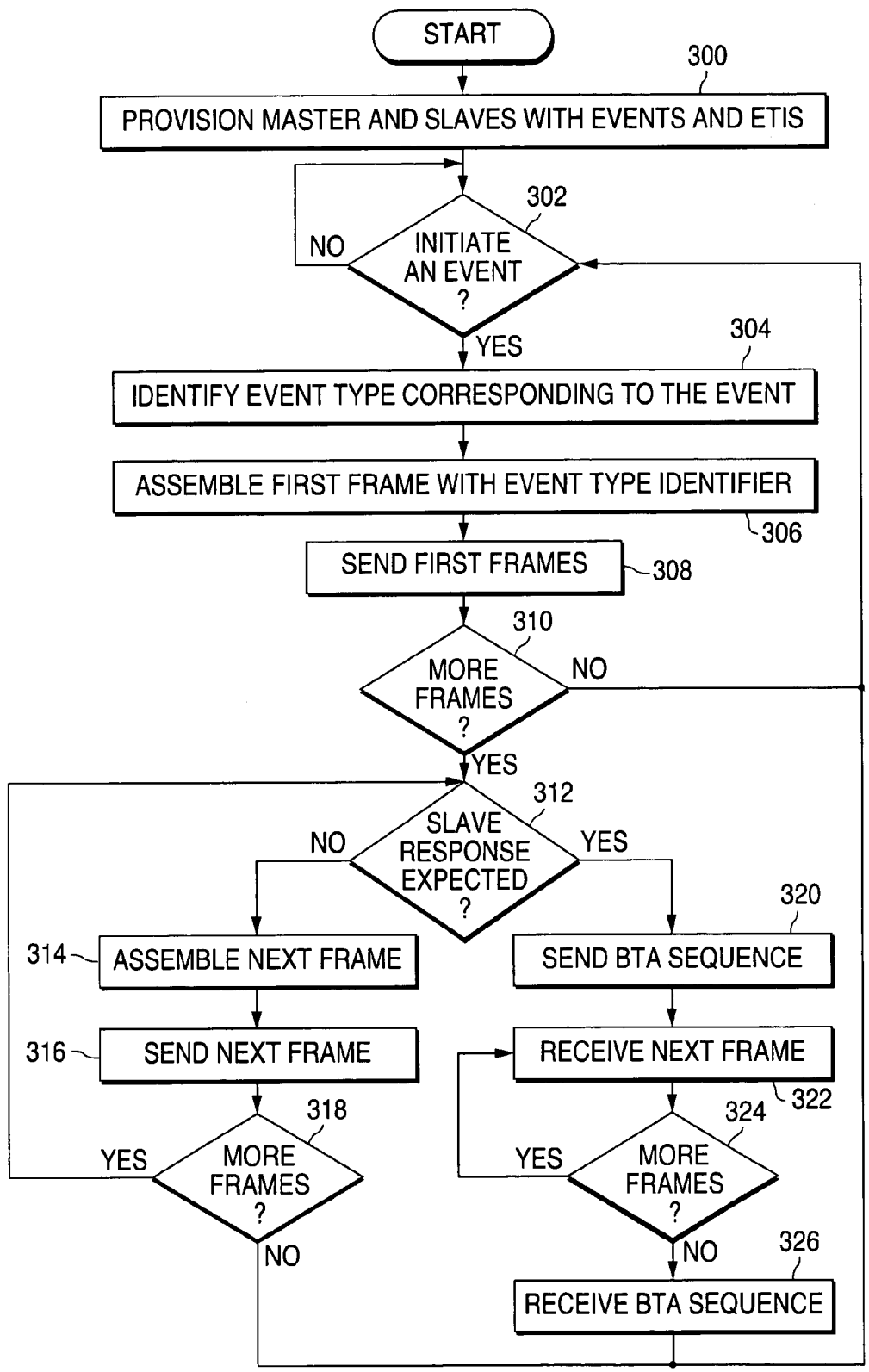
FIG. 3 is a flow diagram illustrating a method for using variable-size frame-based events for communicating over an interface in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system comprising a communication interface between a master component and one or more slave components.

FIG. 1 is a block diagram illustrating a system 100 operable to implement a bus protocol capable of using variable-size frame-based events for communicating over an interface in accordance with one embodiment of the present invention. The system 100 may comprise a power management system, a file transfer system, or any other suitable system that uses a master/slave configuration. For the illustrated embodiment, the system 100 comprises one master 102 and four slaves 104a-d. However, it will be understood that the system 100 may comprise any suitable number of masters 102 and any suitable number of slaves 104 for each master 102 without departing from the scope of the present invention.

The master 102 is operable to communicate with the slaves 104 over an interface, or bus, 106 using variable-size frame-based events. The master 102 is also operable to control the flow of data over the interface 106. The slaves 104 are each operable to respond to the master 102 over the interface 106. As used herein, "each" means every one of at least a subset of the identified items.

As described in more detail below, the master 102 and slaves 104 may communicate with each other using one-frame events, two-frame events, three-frame events and/or n-frame events, where n is any suitable integer. One or more events may be identified based on priority and/or rate of occurrence and defined as one-frame events, two-frame events or any other suitable type of events such that these identified events may be communicated between the master 102 and a slave 104 using fewer frames than other, less important or less common events. As used herein, an "event" means a command, a communication, an interaction and/or any other suitable type of transaction involving the communication of data between the master 102 and a slave 104.

For example, in a system 100 in which the master 102 and the slaves 104 communicate using one-frame events, two-frame events and three-frame events, a first set of events may be identified as the most important and/or most common events and a second set of events may be identified as the next most important and/or most common events. The first set of events may be defined as one-frame events, while the second set of events may be defined as two-frame events. All remaining events may be defined as three-frame events. In communications regarding these events, the one-frame events are communicated with a single frame, the two-frame events are communicated with two frames, and the three-frame events are communicated with three frames.

In accordance with the present invention, a single type of operation may be performed with two or more different types of events. For example, a write operation to a particular register may be performed using a one-frame event, while other write operations may be performed using two-frame or three-frame events. This allows a most frequently occurring and/or a highest priority write operation to be accomplished with less bandwidth than less frequently occurring and/or lower priority write operations. It will be understood that the most frequently occurring and/or the highest priority events may be performed using any suitable number of frames; however, these events may be performed using fewer frames than other events. For some embodiments, events may be assigned to varying degrees of occurrence frequency and/or priority on a continuum such that a first set of events on the highest end of the continuum is performed using the fewest number of frames, followed by a second set of events using a second fewest number of frames, and so on, until a final set of the least frequently occurring and/or the lowest priority events is performed using the most number of frames.

The master 102 and the slaves 104 are operable to be provisioned with the types of events that correspond to possible events between the master 102 and slaves 104. Thus, continuing with the above example, the master 102 and slaves 104 may be provisioned by identifying a first set of events as one-frame events and a second set of events as two-frame events. In this example, any events not identified as one-frame events or two-frame events may be treated as three-frame events. However, it will be understood that all possible events may be explicitly identified and that any suitable combination of event types may be implemented without departing from the scope of the present invention.

As one example of a particular embodiment, the system 100 may comprise a power management system in which a power controller master 102 determines whether or not any adjustments need to be made to its supply and/or threshold voltages by a power management slave 104. For this example, a voltage adjustment event may be defined as a one-frame event, while reads from and writes to one of several registers within the slave 104 may be defined as two-frame events. This system 100 may or may not also provide for additional events to be implemented as three-frame events and/or n-frame events. The voltage adjustment event in this example may then provide for writing a new voltage value to a particular register within the slave 104. Because the voltage adjustment event has been defined as the one-frame event, the one-frame event need not identify itself as a voltage adjustment event nor identify the particular register. The voltage adjustment event may simply identify itself as the one-frame event and provide the new voltage value. For other types of events, including other write operations, multiple-frame events, such as two-frame or three-frame events, may be used.

According to the illustrated embodiment, the master 102 may comprise an event type identifier (ETI) store 110 and a frame assembler 112. The event type identifier store 110 may comprise a table, database or any other suitable type of data store that is operable to store a plurality of events and corresponding event type identifiers. Each event type identifier is operable to identify the corresponding event, as previously described.

The frame assembler 112 is coupled to the event type identifier store 110. The frame assembler 112 is operable to access the event type identifier store 110 to identify an event type for an event to be initiated by the master 102 and to assemble one or more frames for the event based on the number of frames indicated by the identified event type.

For one embodiment, the frame assembler 112 may comprise logic encoded in media. The logic comprises functional instructions for carrying out program tasks. The media comprises computer disks or other computer-readable media, application-specific integrated circuits (ASICs), field-programmable gate arrays (FPGAs), digital signal processors (DSPs), other suitable specific or general purpose processors, transmission media or other suitable media in which logic may be encoded and utilized.

In this way, variable-size frame-based events may be used to communicate between the master 102 and the slaves 104, which reduces the overall amount of data transferred and, thus, minimizes bandwidth consumption. In addition, for the embodiment with only one master 102 in the system 100, no collision detection and arbitration is needed for determining which component has access to and priority over the interface 106, thereby reducing bandwidth consumption to an even greater extent.

FIGS. 2A-C are block diagrams illustrating frame structures for one-frame, two-frame and three-frame events for use in the system 100 in accordance with one embodiment of the present invention. Thus, it will be understood that the embodiments illustrated and described with respect to FIGS. 2A-C are simply examples of frame structure implementations and that other suitable frame structures may be implemented and used in the system 100 without departing from the scope of the present invention.

As used herein, a "frame" is defined to have a frame structure that begins with a start bit 202 and may or may not end with an optional stop bit 204, without any other start bits 202 and/or stop bits 204 within the frame structure, and that may or may not have a predefined length. According to one example, the start bit 202 may comprise a 1, while the stop bit 204 comprises a 0. However, it will be understood that the start bit 202 and the stop bit 204 may each comprise one or more suitable predefined bit values or that the stop bit 204 may be omitted if the frame has a predefined length without departing from the scope of the present invention. In addition, according to one particular embodiment, the frames may comprise a predefined length of twelve bits, including the start and stop bits 202 and 204. However, it will be understood that the frames may comprise any suitable number of bits without departing from the scope of the present invention.

FIG. 2A illustrates one embodiment of a frame structure 200 for a one-frame event. According to this embodiment, the frame structure 200 comprises an event type identifier (ETI) 206, a trip address 208 and a payload 210, in addition to the start and stop bits 202 and 204. The event type identifier 206 is operable to identify the frame structure 200 as corresponding to a one-frame event. This event type identifier 206 may comprise one or more bits, depending on the number of event types used for communicating in the system 100. For example, for an embodiment of the system 100 in which the master 102 and the slaves 104 communicate using only one-frame events and two-frame events, the event type identifier 206 may comprise a single bit with one value indicating a one-frame event and another value indicating a two-frame event.

However, for more than two event types, the event type identifier 206 comprises more than one bit. For example, for one embodiment, the event type identifier 206 may comprise two bits. A 00 may indicate a one-frame event, a 01 may indicate a two-frame event, a 10 may indicate a three-frame event, and a 11 may indicate either a four-frame event or an n-frame event. Thus, for systems 100 using more than four frames for some events, an n-frame event may be identified by the event type identifier 206 and the actual number of frames for a specific frame type may be provided elsewhere within the frames. It will be understood that this example is for illustration only and that any suitable number of variations may be implemented for identifying multiple-frame events.

The trip address 208 comprises an address for one of the slaves 104. For the embodiment in which the system 100 comprises four slaves 104, the trip address 208 may comprise two bits to identify the slave 104 with which the master 102 is communicating. However, it will be understood that the trip address 208 may comprise any suitable number of bits operable to identify one of the slaves 104.

The payload 210 comprises payload data that corresponds to the one-frame event. For the example in which the system 100 comprises a power management system as described above, this payload data may comprise the new voltage values. In addition, if the system 100 provides for a set of commands that may be communicated using one-frame events, the payload data may comprise one of those commands. Thus, the payload data is the data that is to be provided based on the predefined one-frame event. For one embodiment, the payload 210 may comprise seven bits; however, it will be understood that the payload 210 may comprise any suitable number of bits without departing from the scope of the present invention.

FIG. 2B illustrates one embodiment of a frame structure 220 for a two-frame event. Thus, the frame structure 220 is made up of two separate frame structures 220*a* and 220*b*. According to this embodiment, the frame structure 220*a* comprises an event type identifier 222, a trip address 224 and a function segment 226, in addition to the start and stop bits 202 and 204. The event type identifier 222 is operable to identify the frame structure 220 as corresponding to a two-frame event, as described above in connection with the event type identifier 206 of FIG. 2A.

The trip address 224 comprises an address for one of the slaves 104. For the embodiment in which the system 100 comprises four slaves 104, the trip address 224 may comprise two bits to identify the slave 104 with which the master 102 is communicating. However, it will be understood that the trip address 224 may comprise any suitable number of bits operable to identify one of the slaves 104.

According to one embodiment, the function segment 226 may comprise either a register address or a command for the slave 104. For this embodiment, the function segment 226 also comprises a function identifier that is operable to identify the two-frame event as either a register function or a command function. When the function identifier identifies the event as a register function, the remainder of the function segment 226 comprises a register address for one of the registers in the slave 104 identified by the trip address 224. When the function identifier identifies the event as a command function, the remainder of the function segment 226 comprises the command.

For a register function, the identified register is the target for the two-frame event. Thus, the identified register is the register to which data may be written, from which data may be read, or on which any other suitable function may be performed. According to one embodiment, the function segment 226 may comprise four identification bits in order to identify one of up to sixteen registers within a slave 104. However, it will be understood that the function segment 226 may comprise any suitable number of identification bits corresponding to the maximum number of registers in any one of the slaves 104.

In addition, the function segment 226 may also comprise a register function identifier that is operable to identify the register function. For example, the register function identifier may comprise a single bit that is set to one value to identify a read function and to another value to identify a write function. Although described in connection with the frame structure 220*a*, it will be understood that the register function identifier may be provided in any suitable frame structure without departing from the scope of the present invention.

The frame structure 220*b* comprises a payload 228, in addition to the start and stop bits 202 and 204. The payload 228 comprises payload data that corresponds to the two-frame event. Thus, the payload data is the data that is to be provided based on the predefined two-frame event. For example, for register functions, such as writes, the payload 228 may comprise the data that is to be written to the corresponding register. Similarly, for command functions, the payload 228 may comprise data associated with the corresponding command.

For one embodiment, the frame structure 220*b* may also comprise an optional trip address 230 that comprises the same data as the trip address 224 in the frame structure 220*a*. For this embodiment, decoding is simplified because the slaves 104 need not keep a log of on-going events after the first frame of each event. However, without the trip address 230, less bandwidth is required.

FIG. 2C illustrates one embodiment of a frame structure 250 for a three-frame event. Thus, the frame structure 250 is made up of three separate frame structures 250*a*, 250*b* and 250*c*. According to this embodiment, the frame structure 250*a* comprises an event type identifier 252, a trip address 254 and an optional command segment 256, in addition to the start and stop bits 202 and 204. The event type identifier 252 is operable to identify the frame structure 250 as corresponding to a three-frame event, as described above in connection with the event type identifier 206 of FIG. 2A.

The trip address 254 comprises an address for one of the slaves 104. For the embodiment in which the system 100 comprises four slaves 104, the trip address 254 may comprise two bits to identify the slave 104 with which the master 102 is communicating. However, it will be understood that the trip address 254 may comprise any suitable number of bits operable to identify one of the slaves 104. The command segment 256 may comprise a command for the slave 104 identified by the trip address 254.

The frame structure 250*b* comprises a register address 258, in addition to the start and stop bits 202 and 204. The register address 258 is operable to identify one of the registers in the slave 104 identified by the trip address 254. The identified register is the target for the three-frame event. Thus, the identified register is the register to which data may be written, from which data may be read, or on which any other suitable function may be performed. According to one embodiment, the register address 258 may comprise eight or more identification bits in order to identify one of 256 or more registers within a slave 104. However, it will be understood that the register address 258 may comprise any suitable number of identification bits corresponding to the maximum number of registers in any one of the slaves 104.

In addition, the register address 258 may also comprise a register function identifier that is operable to identify the register function. For example, the register function identifier may comprise a single bit that is set to one value to identify a read function and to another value to identify a write function. Although described in connection with the frame structure 250*b*, it will be understood that the register function identifier may be provided in any suitable frame structure without departing from the scope of the present invention.

For one embodiment, the frame structure 250b may also comprise an optional trip address 260 that comprises the same data as the trip address 254 in the frame structure 250a. For this embodiment, decoding is simplified because the slaves 104 need not keep a log of on-going events after the first frame of each event. However, without the trip address 260, less bandwidth is required.

The frame structure 250c comprises a payload 262, in addition to the start and stop bits 202 and 204. The payload 262 comprises payload data that corresponds to the three-frame event. Thus, the payload data is the data that is to be provided based on the predefined three-frame event. For example, for register functions such as writes, the payload 262 may comprise the data that is to be written to the corresponding register. Similarly, for command functions identified by the command segment 256 of the frame structure 250a, the payload 262 may comprise data associated with the corresponding command.

For one embodiment, the frame structure 250c may also comprise an optional trip address 264 that comprises the same data as the trip address 254 in the frame structure 250a. For this embodiment, decoding is simplified because the slaves 104 need not keep a log of on-going events after the first frame of each event. However, without the trip address 264, less bandwidth is required.

Because FIGS. 2B and 2C correspond to multiple-frame events, the events performed using these frame structures 220 and 250 may comprise a response from a slave 104 to the master 102. For example, for a read operation, the slave 104 may respond to a read request sent by the master 102 in one or more earlier frames by sending the requested data in one or more later frames. To handle these types of situations, the system 100 may comprise a dedicated bus (not illustrated in FIG. 1) for the slaves 104 to use for sending data to the master 102, in addition to a dedicated bus 106 for the master 102 to use for sending data to the slaves 104. However, if the slaves 104 use the same bus 106 as the master 102 for sending data, a bus turn-around period is implemented for handing over bus control.

For this embodiment, a bus turn-around protocol may be used to define when the master 102 releases the bus 106, when the slave 104 takes control of the bus 106, when the slave 104 releases the bus 106 after sending its data to the master 102, and when the master 102 resumes control of the bus 106. During handover, the state of the bus 106 may be undefined or defined by a passive element such as a pull-down or pull-up resistor or in any other suitable manner.

For one embodiment, the bus turn-around protocol may provide for handover in one clock cycle. At the start of the clock cycle, the master 102 releases the bus 106 and, at the end of the clock cycle, the slave 104 assumes control of the bus 106. Similarly, after the slave 104 has finished sending data to the master 102, the slave 104 releases the bus 106 at the start of a clock cycle, and the master 102 assumes control of the bus 106 at the end of the clock cycle. However, it will be understood that a bus turn-around protocol may be implemented in any suitable manner without departing from the scope of the present invention.

FIG. 3 is a flow diagram illustrating a method for using variable-size frame-based events for communicating over an interface 106 in accordance with one embodiment of the present invention. The method begins at step 300 where the master 102 and the slaves 104 are provisioned with events and corresponding event type identifiers (ETIs) for possible events between the master 102 and slaves 104. For the embodiment in which the master 102 comprises an event type identifier store 110, the master 102 may be provisioned by storing events and corresponding event type identifiers in the event type identifier store 110.

For one embodiment, the master 102 and slaves 104 are provisioned by identifying a first set of events as one-frame events and a second set of events as two-frame events. Each of the events in the first set of events may be stored in the event type identifier store 110 with a corresponding event type identifier that identifies those events as one-frame events, while each of the events in the second set of events may be stored in the event type identifier store 110 with a corresponding event type identifier that identifies those events as two-frame events. Any events not identified as one-frame events or two-frame events may be treated as three-frame events.

For another embodiment, the master 102 and slaves 104 are provisioned by identifying a first event as a one-frame event and a second set of events as two-frame events with no possible remaining events. However, it will be understood that the master 102 and slaves 104 may be provisioned with any suitable combination of event types, including an explicit identification of all event types or an implicit identification of a remaining set of events as one type of event, without departing from the scope of the present invention.

At decisional step 302, the master 102 decides whether or not to initiate an event. For example, the master 102 may decide to initiate a read of a register in one of the slaves 104 or to initiate any other suitable event. If the master 102 does not decide to initiate an event, the method follows the No branch from decisional step 302 and remains at decisional step 302 until a decision is made to initiate an event. If the master 102 does decide to initiate an event, the method follows the Yes branch from decisional step 302 to step 304.

At step 304, the master 102 identifies the type of event that corresponds to the event to be initiated. For one embodiment, the frame assembler 112 of the master 102 may access the event type identifier store 110 in order to identify the event type. However, it will be understood that the master 102 may identify the event type in any suitable manner without departing from the scope of the present invention.

At step 306, the master 102 assembles the first frame for the event. The master 102 incorporates an event type identifier 206, 222, 252 within the first frame. The remaining portion of the first frame may comprise a trip address 208 and a payload 210, a trip address 224 and a function segment 226, a trip address 254 and a command segment 256 and/or any other suitable data based on the frame structure implemented for the event type corresponding to the event. For one embodiment, the frame assembler 112 of the master 102 assembles the first frame. At step 308, the master 102 sends the first frame to one of the slaves 104 over the interface 106.

At decisional step 310, the master 102 determines whether or not there are any more frames to be assembled based on the event type identified in step 304. If there are more frames to be assembled, the method follows the Yes branch from decisional step 310 to decisional step 312. At decisional step 312, the master 102 determines whether or not a response is expected from the slave 104 at this time. For example, if the operation comprises a read request, the master 102 expects to receive data from the slave 104 after completing the request. If the master 102 does not expect a response from the slave 104 at this time, the method follows the No branch from decisional step 312 to step 314.

At step 314, the master 102 assembles the next frame for the event. The next frame may comprise a payload 228, 262, a register address 258, a trip address 230, 260, 264 and/or any other suitable data based on the frame structure implemented for the event type corresponding to the event. For one embodiment, the frame assembler 112 of the master 102 assembles the next frame. At step 316, the master 102 sends the next frame to the slave 104 over the interface 106.

At decisional step 318, the master 102 determines whether or not there are any more frames to be assembled based on the event type identified in step 304. If there are more frames to be assembled, the method follows the Yes branch from decisional step 318 and returns to decisional step 312, where the master 102 determines whether or not a response is expected from the slave 104 at this time. If there are no more frames to be assembled, the method follows the No branch from decisional step 318 and returns to decisional step 302 where the master 102 may decide to initiate another event.

Returning to decisional step 312, if the master 102 does expect a response from the slave 104 at this time, the method follows the Yes branch from decisional step 312 to step 320. At step 320, the master 102 sends a bus turn-around (BTA) sequence to the slave 104, indicating that the slave 104 may assume control of the bus 106 as described above in connection with FIG. 2. At step 322, the master 102 receives the next frame from the slave 104.

At decisional step 324, the master 102 determines whether or not there are any more frames to be received based on the event type identified in step 304. If there are more frames to be received, the method follows the Yes branch from decisional step 324 and returns to step 322, where the master 102 receives another frame from the slave 104. If there are no more frames to be received, the method follows the No branch from decisional step 324 to step 326.

At step 326, the master 102 receives a bus turn-around (BTA) sequence from the slave 104, indicating that the master 102 may assume control of the bus 106 as described above in connection with FIG. 2, after which the method returns to decisional step 302 where the master 102 may decide to initiate another event.

Returning to decisional step 310, if there are no more frames to be assembled, the method follows the No branch from decisional step 310 and returns to decisional step 302 where the master 102 may decide to initiate another event.

In this way, variable-size frame-based events may be used to communicate between the master 102 and the slaves 104. By selecting the most frequently occurring and/or the highest priority events as the events that may be performed with fewer frames, the amount of data transferred may be minimized, thereby decreasing bandwidth consumption. This decrease in bandwidth consumption in turn has a positive effect on power consumption, clock rates, electromagnetic interference and electromagnetic emissions for the system 100.

Although the present invention has been described with several embodiments, various changes and modifications may be suggested to one skilled in the art. It is intended that the present invention encompass such changes and modifications as fall within the scope of the appended claims.

What is claimed is:

1. A method for reducing bandwidth consumption for communicating over an interface, comprising:
    defining a one-frame event that comprises a specified operation type;
    defining an n-frame event that comprises the specified operation type, where n comprises a value other than 1;
    assembling a single frame for the one-frame event, the single frame comprising an event type identifier operable to identify the single frame as corresponding to the one-frame event;
    sending the single frame over the interface;
    assembling a first flame for the n-frame event, the first frame comprising an event type identifier operable to identify the first frame as corresponding to the n-frame event;
    sending the first frame over the interface;
    assembling a specified number of additional frames for the n-frame event, the specified number comprising one less than n; and
    sending the additional frames over the interface.

2. The method of claim 1, wherein the single frame further comprises a trip address and a payload.

3. The method of claim 1, further comprising provisioning a master and at least one slave with at least two event type identifiers, the event type identifiers operable to identify the one-forme event and the n-frame event.

4. The method of claim 1, wherein n comprises one of 2 and 3.

5. The method of claim 1, further comprising defining a plurality of one-frame events.

6. The method of claim 1, wherein the one-frame event comprises one of a most frequently occurring event and a highest priority event.

7. A method for reducing bandwidth consumption for communicating over an interface, comprising
    defining a two-frame event that comprises a specified operation type;
    defining an n-frame event that comprises the specified operation type, where n comprises a value other than 1 and 2;
    assembling a first frame for the two-frame event, the first frame for the two-frame event comprising an event type identifier operable to identify the first frame for the two-frame event as corresponding to the two-frame event;
    sending the first frame for the two-frame event over the interface;
    assembling a second frame for the two-frame event; and
    sending the second frame for the two-frame event over the interface.

8. The method of claim 7, wherein:
    the first frame for the two-frame event comprises one of a command and an address operable to identify a register; and
    the first frame further comprises a function identifier operable to identify the two-frame event as (i) a command function when the first frame for the two-frame event comprises a command and (ii) as a register function when the first frame for the two-frame event comprises an address operable to identify a register.

9. The method of claim 7, wherein the one-frame event comprises one of a most frequently occurring event and a highest priority event.

10. The method of claim 7, further comprising;
    assembling a first frame for the n-frame event, the first frame for the n-frame event comprising an event type identifier operable to identify the first frame for the n-frame event as corresponding to the n-frame event; and
    sending the first frame for the n-frame event over the interface.

11. The method of claim 10, further comprising:
    assembling a specified number of additional frames for the n-frame event, the specified number comprising one less than n; and
    sending the additional frames for the n-frame event over the interface.

12. A method for using variable-size frame-based events for communicating over an interface, comprising:
    defining a one-frame event that comprises a specified operation type;

defining a plurality of n-frame events, at least one of the n-frame events comprising the specified operation type, where n comprises a value other than 1 and where n equals 2 for at least one of the n-frame events;

assembling a single frame for the one-frame event, the single frame comprising an event type identifier operable to identify the single frame as corresponding to the one-frame event;

sending the single frame over the interface;

assembling a first frame for a two-frame event, the first frame for the two-frame event comprising an event type identifier operable to identify the first frame for the two-frame event as corresponding to the t frame event:

sending the first frame for the two-frame event over the intrface;

assembling second frame for the two-frame event; and sending the second frame for the two-frame event over the interface.

13. The method of claim 12, wherein the one-frame event comprises one of a most frequently occurring event and a highest priority event.

14. A method for using variable-size frame-based events for communicating over an interface, comprising:

defining a one-frame event that comprises a specified operation type;

defining a plurality of n-frame events at least one of the n-frame events comprising the specified operation type, where n comprises a value other than 1;

assembling a single frame for the one-frame event, the single frame comprising an event type identifier operable to identify the single frame as corresponding to the one-frame event;

sending the single frame over the interface;

assembling a first frame for one of the n-frame events, the first frame for the n-frame event comprising an event type identifier operable to identify the first frame for the n-frame event as corresponding to the n-frame event;

sending the first frame for the n-frame event over the interface;

assembling a specified number of additional frames for the n-frame event, the specified number comprising one less than n; and sending the additional frames for the n-frame event over the interface.

15. A master component operable to communicate with a plurality of slave components over an interface, the master component comprising:

an event type identifier store operable to store a plurality of events and, for each event one of a plurality of event type identifiers corresponding to the event, the events comprising an m-frame event that comprises a specified operation type and an n-frame event that comprises the specified operation type, where m comprises a value other than a; and a frame assembler operable to access the event type identifier store to identify an event type for a particular event and to assemble a specified number of frames for the event, the specified number based on the event type for the event, a first frame comprising the event type identifier corresponding to the event type for the event.

16. A system for using variable-size frame-based events for communicating over an interface, comprising:

a computer-processable medium; and logic stored on the computer-processable medium, the logic operable to identify an event type for a first event and a second event, to assemble a first specified number of frames for the first event, the first specified number based on the event type for the first event, a first frame for the first specified number of frames comprising an event type identifier operable to identify the event type for the first event, and to assemble a second specified number of frames for the second event, the second specified number different from the first specified number, a first frame for the second specified number of frames comprising an event type identifier operable to identify the event type for the second event, the first event comprising a specified operation type and the second event comprising the specified operation type.

* * * * *

UNITED STATES PATENT AND TRADEMARK OFFICE
CERTIFICATE OF CORRECTION

PATENT NO.         : 7,457,317 B1                                              Page 1 of 1
APPLICATION NO. : 10/846395
DATED              : November 25, 2008
INVENTOR(S)        : Juha Pennanen It is certified that error appears in the above-identified patent and that said Letters Patent is hereby corrected as shown below:

Column 11, Claim 12, line 13, delete "t" and insert -- two- --

Column 11, Claim 12, line 16, after "assembling" insert -- a --

Column 11, Claim 14, line 27, after "events" insert -- , --

Column 12, Claim 15, line 10, after "event" insert -- , -- (second occurrence)

Column 12, Claim 15, line 15, delete "a" and insert -- n --

Signed and Sealed this

Twenty-second Day of September, 2009

David J. Kappos
*Director of the United States Patent and Trademark Office*